United States Patent
Johannsmann et al.

(10) Patent No.: US 10,676,396 B2
(45) Date of Patent: Jun. 9, 2020

(54) PROCESS AND APPARATUS FOR CALCINATION OF GYPSUM

(71) Applicant: KNAUF GIPS KG, Iphofen (DE)

(72) Inventors: Olaf Johannsmann, La Zubia (DE); Rainer Schulte, Granada (ES); Juan Jose Ruiz, Hijar (ES)

(73) Assignee: KNAUF GIPS KG, Iphofen (DE)

( * ) Notice: Subject to any disclaimer, the term of this patent is extended or adjusted under 35 U.S.C. 154(b) by 0 days.

(21) Appl. No.: 16/462,016

(22) PCT Filed: Nov. 18, 2016

(86) PCT No.: PCT/EP2016/001955
§ 371 (c)(1),
(2) Date: May 17, 2019

(87) PCT Pub. No.: WO2018/091062
PCT Pub. Date: May 24, 2018

(65) Prior Publication Data
US 2019/0330106 A1    Oct. 31, 2019

(51) Int. Cl.
*C04B 11/28* (2006.01)
*C04B 11/028* (2006.01)
(52) U.S. Cl.
CPC .............................. *C04B 11/0286* (2013.01)
(58) Field of Classification Search
CPC ......... C01F 11/46; C04B 11/02; C04B 11/028
See application file for complete search history.

(56) References Cited

U.S. PATENT DOCUMENTS

| | | |
|---|---|---|
| 4,113,836 A | 9/1978 | O Connor |
| 2004/0131714 A1* | 7/2004 | Burke ...................... B28B 3/20 425/113 |

OTHER PUBLICATIONS

International Search Report for PCT/EP2016/001955 dated Aug. 22, 2017.
MoistTech Corp, "Gypsum Moisture," XP002772515, Oct. 24, 2012.

* cited by examiner

*Primary Examiner* — Timothy C Vanoy
(74) *Attorney, Agent, or Firm* — Millen, White, Zelano & Branigan, PC; Ryan Pool

(57) ABSTRACT

The invention pertains to a process for modifying gypsum, wherein
 a continuous feed of raw gypsum is provided;
 the water content of the raw gypsum is determined in the continuous feed by near infrared spectroscopy (NIR) measurement;
 the raw gypsum is calcined in a calcination unit at a fire rate to remove water from the raw gypsum and to obtain a continuous feed of calcined gypsum having a water content within a selected range;
 a water content of the calcined gypsum is determined by near infrared spectroscopy, and
 the fire rate is adjusted based on the water content of the raw gypsum and of the calcined gypsum.
Further, the invention pertains to an apparatus for performing said process.

15 Claims, 2 Drawing Sheets

PROCESS AND APPARATUS FOR CALCINATION OF GYPSUM

The invention pertains to a process for calcination of gypsum and to an apparatus for calcination of gypsum that can be used to execute the process.

Gypsum is a soft sulfate mineral composed of calcium sulfate dihydrate which is widely mined or is obtained as a secondary product in industrial processes, e.g. FGD-gypsum (flue-gas desulfurization), titano-, phospho- or citrogypsum. Gypsum contains water of crystallization and has a chemical formula of $CaSO_4.2H_2O$. Besides water of crystallization gypsum may also comprise water that is not chemically bound designated as "moisture" in the following. By calcination the water of crystallization may be removed to obtain several modifications of gypsum:

α-Hemihydrate ($CaSO_4.\frac{1}{2}H_2O$) is obtained when heating gypsum in an autoclave in wet atmosphere or by treatment with acids or aqueous salt solutions. Due to its higher density it is used for gypsum having a higher hardness. For setting less water is required but an increase setting time is needed.

β-Hemihydrate ($CaSO_4.\frac{1}{2}H_2O$) is obtained by calcining gypsum in an open atmosphere. Upon addition of water the β-Hemihydrate is transformed into the di-hydrate within minutes. It is used for gypsum having lower hardness and is used for example in construction industry.

Anhydrite III ($CaSO_4.0,x\ H_2O$) is obtained upon calcination at temperatures of up to 300° C. In the presence of water, e.g. air moisture, a transformation to the hemihydrate or dihydrate occurs very quickly.

Anhydrite $II_s$ ($CaSO_4$) is obtained upon calcination at temperatures of 300 to 500° C. It is sparingly soluble in water. In the presence of water a slow hydration occurs within hours or days.

Anhydrite $II_u$ ($CaSO_4$) is obtained upon calcination at temperatures of 500 to 700° C. This gypsum modification is insoluble in water.

Anhydrite I ($CaSO_4$) is the high temperature modification of gypsum and is formed at temperatures of above 1180° C. (dead burned gypsum).

Calcination is usually performed in kilns. Exemplary calcining units are kettles, which may be indirectly heated, roller mills, ball mills and hammer mills. As raw material natural or synthetic gypsum, calcium sulfate dihydrate (Ca[$SO_4$].$2H_2O$), is used. During calcination moisture contained in the raw material and water of crystallization bound to the calcium ion is removed. The properties of the calcined gypsum are largely influenced by the calcination conditions, which e.g. influence the amount of water of crystallization removed during calcination, and the processing during milling. Even when starting from the same raw material, the products obtained by different calcining methods differ, e.g. in their initial set-up time. To achieve a constant quality level of the calcined gypsum it is desirable that the calcination conditions are kept constant such that a constant amount of water is removed from the raw material and e.g. no unwanted gypsum modifications arise. According to the state of the art the quality of the calcined gypsum is controlled regularly by taking a sample and analysis of the same in the lab. In case the quality of the calcined gypsum runs out of the specification, the calcination conditions are adjusted, e.g. by adjustment of the temperature in the kiln or by adjusting the feed of the raw material to the kiln. This adjustment is usually done by a machine operator.

The calcined gypsum can be immediately be used in a production line, it can be bagged for transport or it is further processed.

The calcined gypsum can be ground to a desired particle size. Grinding/milling can be performed separately from calcination and can be performed before and/or after calcination. Milling and calcining may be performed in consecutive steps in different units or may be performed in one stage in a single unit. In flash calcining units, drying, grounding/milling and calcining is done in a single stage in a single machine. Further, the amount of energy necessary for heating the kiln for calcination of gypsum is quite high. It is desirable to limit the power consumption to the amount necessary for obtaining the desired product.

In particular when the raw gypsum is mined from a natural source, but also for gypsum obtained as secondary product in an industrial process, the amount of physically bound moisture might vary. The energy consumption necessary for calcination of the gypsum therefore might also vary over time. Also the quality of the raw material might vary over time when performing gypsum calcination in an industrial scale. This will then influence the quality of the calcined gypsum. Further, to ensure removal of water of crystallization in a desired degree to adjust the quality of the calcined gypsum, the temperature of the kiln usually is kept at a higher level to compensate variations in the quality of the raw gypsum material. However, higher temperatures than necessary result in higher amounts of Anhydrite III accidentally produced. This is not desirable because Anhydrite III sets very fast and has a higher water demand than stucco. Unknown amounts of Anhydrite III in stucco therefore result in severe problems when used for example in plaster board production lines.

It is an object of the invention to provide a process for calcination of gypsum that allows to reduce power consumption of the calcination process and further allows to achieve a constant quality of the calcined gypsum.

This object is solved according to the invention by a process as defined in claim 1. Preferred embodiments are defined in the depending claims.

In the process according to the invention
a continuous feed of raw gypsum is provided;
the raw gypsum is calcined in a calcination unit at a fire rate to remove water from the raw gypsum and to obtain a calcined gypsum having a water content within a defined range;
a water content of the calcined gypsum is determined by near infrared spectroscopy, and
the fire rate is adjusted based on the water content of the calcined gypsum.

By determination of the water content in the gypsum after calcination, the fire rate of the gypsum can be adjusted very quickly and variations in the quality of the gypsum can be balanced such that a constant quality of the calcined gypsum is obtained. Due to the very close process control the process can be performed very efficiently and the energy consumption can be minimized to the minimally required amount necessary for calcination to obtain a desired quality of calcined gypsum.

"Raw gypsum" as used in the description of the invention is understood to be a gypsum that has not yet been calcined, and in particular has not been calcined at a temperature of more than 100° C.

As raw gypsum may e.g. be used gypsum as mined from a natural source or a gypsum as obtained as secondary product from an industrial process or another source. According to an embodiment the raw gypsum is calcium sulfate dihydrate ($CaSO_4 \cdot 2H_2O$). It is preferred to use a gypsum containing a high amount of calcium sulfate, preferably more than 70 wt.-%, according to a further embodiment more than 75 wt.-%, according to a further embodiment more than 80 wt.-% calcium sulfate and according to a still further embodiment more than 85 wt.-% calcium sulfate. According to an embodiment, the raw gypsum contains less than 100 wt.-%, according to a still further embodiment less than 95 wt.-% calcium sulfate and according to a still further embodiment contains less than 90 wt.-% calcium sulfate. The percentage refers to dry gypsum, i.e. gypsum that has been dried at 130° C. until constant weight. The raw gypsum may contain other minerals in a low amount, i.e. impurities, but it is preferred to use a raw gypsum containing a high amount of calcium sulfate.

The raw gypsum may be broken or milled before calcination. Usual mills are used to break or mill the raw gypsum as e.g. mined. According to an embodiment the raw gypsum is broken down and milled to particles of less than 5 cm diameter, according to a further embodiment of less than 2 cm diameter. According to an embodiment, the raw gypsum is broken to particles having a diameter of more than 0.01 mm, according to a further embodiment of more than 0.05 mm. The particle size can be adjusted after breaking or milling e.g. by sieving through a sieve of a particular mesh size, e.g. 5 cm, 2 cm, 0.5 mm, 0.2 mm or 0.063 mm. Other separation techniques known to the skilled artisan can be used as well, e.g. wind sifting or separation in a cyclone.

The raw gypsum may be dried before calcination, e.g. in a kiln, to adjust moisture content of the raw gypsum. According to an embodiment the raw gypsum before calcination contains less than 10 wt.-%, according to a further embodiment less than 5 wt.-% water. According to an embodiment, the raw gypsum contains more than 1 wt.-%, according to a further embodiment more than 2 wt.-% water. However, it is also possible to use raw gypsum having a higher moisture content, i.e. a moisture content of more than 10 wt.-%.

Raw gypsum contains two types of water. A first type of water is physically bound water contained e.g. in the pores of the gypsum or absorbed on the surface of gypsum particles. These water molecules can be desorbed or evaporated at lower temperatures of around 100° C. The amount of physically bound water can vary within quite large ranges depending e.g. on the natural source (mine) they have been mined from. In the following this water content will be designated as "moisture" or "moisture content". Both terms are used equivalently.

The second type of water is chemically bound water of crystallization. The water molecules are coordinated to the calcium ion and a higher amount of energy is necessary to desorb this water molecules. In the following this water and the corresponding water content will be designated as "water of crystallization" or "content of water of crystallization".

As used in the following "water content" used as a term is understood to be the total water content, i.e. the sum of moisture content and content of water of crystallization.

The raw gypsum is provided in a continuous feed. A continuous feed is understood to be a feed that transports raw gypsum to a calcination unit over a longer time period, e.g. an hour or a day, such that the raw gypsum passes a fixed position that can be used for installation of a control unit. The continuous feed according to an embodiment has a constant feed rate. The continuous feed may be provided e.g. by a belt conveyor. Scales may be provided according to an embodiment for control of the feed rate. Basically, also a discontinuous feed can be used to provide the raw gypsum. However, a continuous feed is preferred.

The feed rate is adjusted according to the equipment used for calcination of the raw gypsum, e.g. the capacity of the calcination unit, the heating rate of the calcination unit and the residence time of the raw gypsum in the calcination unit, etc. This adjustment is routinely made by the skilled artisan based on his general knowledge.

The water content of the calcined gypsum is determined according to the invention in the continuous feed by near infrared spectroscopy (NIR) measurement.

Near infrared spectroscopy is a method of analysis widely known to the skilled artisan. NIR spectroscopy uses a range of 13.000-4.000 $cm^{-1}$ and is a well-established method for determination of moisture. For scaling of the method a data set of NIR spectra is produced by analysis of known samples with a known water content, in particular a known moisture content and a known content of water of crystallization. This data set is then used to establish an equation that then can be used to calculate the water content, moisture content and content of water of crystallization in an unknown sample, i.e. in the continuous feed of raw gypsum. Methods for establishing such equation are well-known to the skilled artisan and are described e.g. in the user manuals of commercially available NIR spectrometers or in scientific literature.

The analysis by NIR spectroscopy is preferably performed contactless to avoid contamination of the probe head. However, according to another embodiment it is also possible to bring the probe head of the NIR spectrometer into direct contact with the continuous feed of raw gypsum.

The analysis of the NIR spectra is performed by a software routinely installed in commercially available NIR spectrometer and the amount of water comprised in the raw gypsum is obtained.

According to an embodiment, the NIR analysis is performed in regular time intervals, e.g. every minute such that a continuous control of the water content in the continuous feed of raw gypsum is provided. It is possible to use other time intervals for determination of the water content of the raw gypsum. According to an embodiment, the time interval between consecutive NIR measurements is selected less than 5 minutes, according to a further embodiment less than 2 minutes. According to an embodiment, the time interval between consecutive NIR measurements is selected larger than 10 seconds, according to an further embodiment larger than 30 seconds.

The NIR measurements can be performed in regular intervals. However, it is also possible to perform NIR measurements in irregular time intervals.

According to an embodiment, the NIR measurement is performed in a continuous mode.

According to an embodiment, the NIR measurement is performed at a measuring station that is installed at a fixed position and the continuous feed of calcined gypsum is passing by the measuring station.

In an embodiment of the process of the invention in which the velocity of the continuous feed is known it is possible to identify the spot where the NIR measurement has been performed in the continuous feed of calcined gypsum in each stage of the process, e.g. before or after calcination of the raw gypsum or before or after cooling of the calcined gypsum.

The NIR spectra taken from the continuous feed of gypsum may be stored for documentation or may be used for process control in combination with other process data.

Storage and further use can be performed electronically, e.g. by a computer device of some kind.

The raw gypsum is calcined in a calcination unit at a fire rate to remove water from the raw gypsum and to obtain a calcined gypsum having a water content within a selected range, especially having a content of water of crystallization in a predefined range. According to the invention the fire rate is adjusted based on the amount of water determined by NIR spectroscopy in the calcined gypsum. For determination of the water content in the calcined gypsum, a first measuring station for NIR spectroscopy is provided.

For calcination of the raw gypsum are used known calcination units. Preferably are used calcination units that allow a continuous calcination of the continuous feed of raw gypsum. The continuous feed of raw gypsum is continuously fed to the calcination unit to be continuously calcined and thereby is continuously transported through the calcination unit. Suitable calcination units are known to the skilled artisan. Exemplary embodiments of suitable calcination units are rotary kilns, belt calciners, impact mills, hammer mills, roller mills and ball ring mills. The calcination units can also be used as flash calciners.

The calcination unit comprises according to an embodiment at least one stage but according to a further embodiment can comprise more than one stage, e.g. two or three stages. Different temperatures can be used in different stages. According to an embodiment, in a first stage the gypsum is dried and milled and in a second stage the gypsum is calcined.

According to a further embodiment, the calcination unit comprises only one unit, wherein according to a further embodiment the gypsum is dried, milled and calcined.

According to an embodiment, the calcination unit is a flash calcination unit. In a flash calcination unit the gypsum is calcined within a short time interval. Therefore higher temperatures are used for calcination than e.g. in calcination in a kettle. In flash calcination the temperature for calcination is selected higher than the temperature at which the corresponding gypsum modification forms. Due to the short residence time in the flash calcination unit, the gypsum is not overheated. However, it is necessary to carefully supervise the calcination to avoid formation of unwanted gypsum modifications as side product. As an example, the pre-crushed and, as the case may be, dried or partly calcined gypsum may enter a flash calcination unit heated to a temperature of 750° C. Inside the flash calcination unit, the gypsum is heated to a predetermined temperature. When having reached the predetermined temperature and formation of the desired gypsum modification, the calcined gypsum leaves the flash calcination unit and is cooled. When e.g. producing gypsum hemihydrate, the temperature required for the complete conversion of gypsum dihydrate to gypsum hemihydrate is about 160° C. When the gypsum has reached this temperature, the calcined gypsum passes to a low-fire compartment of the calcining unit to leave the unit.

The processing conditions for calcination are selected based on the knowledge of the skilled artisan depending on the amount of gypsum, the residence time, the gas atmosphere and the amount of hot gases used for calcining, the design of the calcination unit, etc.

According to an embodiment, in flash calcination the stages are formed by cyclones in which a mixture of hot gas and fine gypsum particles is rotated at a particular temperature and speed.

According to an embodiment, finely divided raw gypsum is introduced at a gas inlet duct to the top most preheated cyclone. It is subsequently preheated by hot, countercurrent gas flow as it is continuously collected and passed down to other cyclone stages in the preheater before entering the gas suspension calciner. According to an embodiment the gas suspension calciner is a vertical cylindrical design in which fuel combustion is in intimate contact with the gypsum or via an external air heater. Preheated combustion air is introduced into the bottom of the calciner where it is mixed with fuel and preheated feed material. The turbulent swirling mixture of combustion gases, fuel and material produces a highly uniform temperature profile throughout the furnace.

However, also other calcination processes known to the skilled artisan can be used for calcination of gypsum.

The mixture of hot gases and solid gypsum particles is separated after calcination. A filter can be used for separation. According to an embodiment, a cyclone positioned at the outlet of the furnace separates the gas and material. The calcining temperature and atmosphere can be closely controlled for even burning, uniform product quality and emission control.

When using flash calcination the gypsum particles according to an embodiment are adjusted to a particle size within a range of less than 10 mm, according to a further embodiment within a range of 0.1 to 8 mm, according to a further embodiment within a range of 0.2 to 5 mm.

When flash calcination is performed in combination with milling, also larger particles sizes may be selected for the raw gypsum particles. According to an embodiment, the particle size of the raw gypsum before calcination is selected within a range of less than 80 mm, according to a further embodiment within a range of less than 60 mm.

Calcination has been described with reference to flash calcination. However, alternative calcination techniques known to the skilled artisan can be used as well.

The calcination is performed at a fire rate to remove water from the raw gypsum and to obtain a calcined gypsum having a content of water of crystallization within a selected range. The term "fire rate" determines the conditions used for calcination in the calcination unit. Such conditions are determined by parameters like e.g. the amount of raw gypsum introduced into the calcination unit within a particular time interval (feed rate), the temperature within the calcination unit, the amount of gas and fuel introduced into the calcination unit, the velocity or transport rate of the gypsum within the calcination unit, etc.

These parameters can be adjusted to obtain a calcined gypsum having a water content within a selected range. The range of the water content is selected by the skilled artisan corresponding to the desired quality of the calcined gypsum and its intended use.

The temperature within the calcination unit according to an embodiment is selected higher than 100° C., according to a further embodiment higher than 110° C. According to a further embodiment, the temperature within the calcination unit for calcining the raw gypsum is selected within a range of 110 to 180° C. According to a further embodiment, the temperature within the calcination unit is selected in a range of less than 900° C.

A range of 110° C. to 180° C. is suitable for production of plaster of Paris. A range of 290° C. to 900° C. is suitable for production of anhydrite.

When using flash calcination, the temperature within the calcining unit is selected higher but the gypsum particles are nevertheless heated to the temperatures mentioned before by adjustment of the residence time.

After calcination a continuous feed of calcined gypsum is provided that leaves the calcination unit for further processing.

After calcination the amount of water comprised in the calcined gypsum is determined by NIR spectroscopy. The determination of the water content can be performed in a manner as described before.

According to an embodiment, the water content of the raw gypsum is determined in the continuous feed by near infrared spectroscopy (NIR) measurement. For determination of the water content in the raw gypsum, a second measuring station for NIR spectroscopy is provided. The adjustment of the fire rate in the calcination unit is then adjusted based on the water content as determined in the calcined gypsum as well as determined in the raw gypsum.

According to an embodiment a measuring station for NIR spectroscopy is installed at a fixed position and the feed of calcined gypsum is passed by the measuring station. NIR spectra can be collected continuously or at regular or irregular intervals and processed to determine the amount of water contained in the calcined gypsum. The data obtained at the measuring station can be stored for documentation or can be used for process control. Preferably, they are stored in the same place or computer as the data of the raw gypsum.

According to an embodiment of the process according to the invention, roughly the spot within the continuous feed of calcined gypsum where the water content of the calcined gypsum is determined by NIR spectroscopy is equivalent to the spot in the continuous feed of raw gypsum where the water content of the raw gypsum is determined. This can be achieved by determination of the water content in the calcined gypsum at a later time than the determination of the water content in the feed of raw gypsum such that during this time interval the gypsum has been transported from the measuring station for determination of the water content in the raw gypsum to the measuring station for determination of the water content in the calcined gypsum.

The water content of the raw gypsum and of the calcined gypsum is then used to adjust the fire rate within the calcination unit. The adjustment can be achieved e.g. by adjusting the feed rate of the raw gypsum to the calcination unit, by adjusting the temperature within the calcination unit, e.g. by adjusting the fuel or gas feed rate to the calcination unit, or by adjusting the feed rate for passage of the gypsum through the calcination unit. Other parameters that influence the rate of water removal from the gypsum during calcination can be used as well.

The water content of the calcined gypsum as determined at the NIR measuring station positioned downstream of the calcination unit can be compared to the selected range for the calcined gypsum and if the determined water content is outside the selected range, then the fire rate is adjusted accordingly until the determined water content is within the selected range. The water content of the raw gypsum can be used to adjust the fire rate according to varying water content of the raw gypsum.

In an embodiment in which the water content of the raw gypsum and the calcined gypsum is determined at regular intervals a processing unit can be provided for automatically adjusting the fire rate of the calcination unit by comparison of the determined water content with selected ranges defined for the water content of the raw gypsum and of the calcined gypsum.

When leaving the calcination unit, the calcined gypsum still is at a high temperature of e.g. 130° C. to 160° C. According to an embodiment, a cooling unit is provided after the calcination unit to cool the calcined gypsum. According to an embodiment, the calcined gypsum is cooled to a temperature of less than 110° C., according to a further embodiment to a temperature of less than 100° C., according to a further embodiment to a temperature of less than 80° C. and according to a still further embodiment to a temperature of less than 50° C. According to a further embodiment, the calcined gypsum is cooled to a temperature of more than 10° C. According to an embodiment the calcined gypsum is cooled to ambient temperature or a temperature slightly above ambient temperature. Ambient temperature is understood to be a temperature within a range of 10 to 40° C. However, it is also possible to adjust the temperature to a value above or below that range. A temperature slightly above ambient temperature is understood to be a temperature of up to 20° C. above ambient temperature.

According to an embodiment the water content of the calcined gypsum is determined by NIR spectroscopy after cooling of the calcined gypsum.

According to a still further embodiment the amount of water present in the gypsum feed is determined by NIR spectroscopy in the continuous feed of raw gypsum, in the continuous feed of calcined gypsum and/or in the continuous feed of cooled calcined gypsum.

The water content of the raw gypsum and of the calcined gypsum can be determined directly in the continuous feed of raw gypsum, in the continuous feed of calcined gypsum and/or in the continuous feed of cooled calcined gypsum. The NIR spectrometer used for analysis is then positioned at a suitable site next to the continuous feed.

However, variations may occur in the continuous feed of gypsum that can influence the result of the NIR measurements.

According to an embodiment, a gypsum sample is taken from at least one of the group of continuous feed of raw gypsum, continuous feed of calcined gypsum, and continuous feed of cooled gypsum for analysis by NIR spectroscopy.

By taking samples it is possible to further process the sample for preparation for an analysis by NIR spectroscopy. Such preparation can e.g. be a milling step or a provision of a particular amount of sample, a homogenization of the sample or a provision of a particular layer thickness of the sample or a preparation of an even surface of the sample. Such a sample preparation allows an increase in accuracy and reproducibility of the determination of the water content in the sample.

The sample can be taken in defined intervals, preferably at constant intervals. According to an embodiment, the time interval between consecutive sample taking is selected less than 5 minutes, according to a further embodiment less than 2 minutes. According to an embodiment, the time interval between consecutive sample taking is selected larger than 10 seconds, according to an further embodiment larger than 30 seconds.

According to a further embodiment the sample taking is performed in a continuous manner, e.g. by continuously branching off a sample feed from the continuous gypsum feed.

According to an embodiment the sample is milled to a particle size of less than 2 mm. According to a further embodiment the sample is milled to a particle size within a range of less than 1.5 mm. According to a further embodiment the sample is milled to a particle size of more than 0.01 mm, according to a still further embodiment the sample is milled to a particle size of more than 0.1 mm. The particle size can be adjusted e.g. by adjustment of the milling process or by a sieving step.

The measuring station for determination of the water content by NIR spectroscopy can be provided at the continuous feed of gypsum to directly determine the water content of the gypsum in the continuous feed.

According to an embodiment of the invention at least one external measuring station is provided for NIR measurement and the gypsum sample is transported to the at least one external measuring station for determination of the water content of the gypsum sample. An external measuring station is understood to be a measuring station that is positioned distant to the continuous feed of gypsum and the gypsum samples have to be transferred to the external measuring station for analysis. For transferring the gypsum samples suitable transport means are provided, e.g. a conveyor belt.

The external measuring station then can be positioned at a place with sufficient space available and interference with the continuous production process, where large amounts of gypsum are processed, eventually at high temperature, can be minimized. In the processing of gypsum large amounts of dust occur that can corrode the equipment of the measuring station and it is favorable to position the measuring station at a place of reduced impact of such factors.

Sample taking can be performed continuously by e.g. continuously dividing off a sample feed from the continuous gypsum feed. However, it is also possible to take samples in particular intervals, e.g. in intervals as mentioned above, and to then transport the samples to the external measuring station. For sample taking the continuous feed according to an embodiment can be stopped for sample taking and then is continued again after sample taking.

According to a further embodiment, the gypsum sample is provided at the measuring station in a standardized sample form.

A standardized form of a gypsum sample is understood to be a sample provided in a reproducible form for NIR measurement for determination of the water content. The data obtained from the NIR measurement then are reproducible and are suitable in particular for an automatized process control of the calcination process.

The standardized form of the gypsum sample is always provided at the measuring station in the same form. For standardization the sample is milled to a particular particle size according to an embodiment. According to a further embodiment, a particular layer thickness of a sample layer is adjusted and an even surface of the sample layer is provided. An even surface of the sample can be obtained by leveling the sample layer by a leveling means positioned above transport means for transporting the sample to the measuring station. The sample layer is passing the leveling means and excess sample material is removed by the levelling means to obtain an even surface of the sample layer.

According to a further embodiment the gypsum sample is returned to the continuous gypsum feed after determination of the water content. The sample is then processed further together with the continuous gypsum feed.

Depending on the amount of gypsum processed in the continuous gypsum feed and the amount of sample taken, in particular when the amount of sample taken is very small compared to the amount of continuous gypsum feed, sample taking and return of the sample does not excessively influence the NIR measurement due to mixing processes occurring in the continuous gypsum feed during transportation.

To minimize influences between samples taken from the continuous gypsum feed, according to an embodiment the return of the sample to the gypsum feed is performed in a manner that sample taking and return of the sample are non-interacting and a sample is not analyzed twice. This can be achieved by a suitable positioning of the spot for taking a sample and the spot for returning the sample to the continuous gypsum feed after analysis. According to a further embodiment sample taking is interrupted while a sample already analyzed is returned to the continuous sample feed.

As already discussed above, in particular for automatization of the calcination process it is favorable that samples are taken from the same spot within the continuous gypsum feed while the gypsum feed passes the production process and thereby passes the measuring stations or the spots for sample taking.

According to an embodiment, a first gypsum sample is taken from the continuous feed of raw gypsum, the continuous feed of raw gypsum is calcined in the calcination unit and a second sample is taken from the continuous feed of calcined gypsum, wherein the second sample is taken from a spot within the continuous feed of calcined gypsum that corresponds to a spot of the continuous feed of raw gypsum, where the first gypsum sample has been taken.

The results obtained from the sample of raw gypsum can then be directly compared with the results of the sample of calcined gypsum which allows a further increase in precision of process control and a further increase in quality of the calcined gypsum since the calcination process can directly be modified according to variations of the gypsum samples taken at a particular spot within the continuous gypsum feed. In other words, there is a continuous feedback mechanism by which the calcination process can be automatically controlled.

According to a further embodiment, the amount of water of crystallization contained in the raw gypsum and/or the calcined gypsum is determined by NIR spectroscopy and is further used for control of the calcination process, in particular for adjustment of the fire rate.

According to an embodiment of the process according to the invention:
the water content of the raw gypsum comprises a moisture content of physically bound water and a content of water of crystallization, and a content of water of crystallization $C_r$ is determined in the raw gypsum by NIR spectroscopy;
an amount $\Delta$ is defined, corresponding to an amount of water of crystallization to be removed from the raw gypsum;
a set-point S for a content of water of crystallization comprised in the calcined gypsum is determined by subtracting $\Delta$ from $C_r$ ($S=C_r-\Delta$);
the raw gypsum is fired at a fire rate to obtain calcined gypsum;
a content of water of crystallization $C_c$ of the calcined gypsum is determined by NIR spectroscopy; and
the fire rate is adjusted such that $S-C_c=0\pm\delta$, wherein $\delta$ is a maximum deviation.

As already explained above, raw gypsum contains two types of water. A first type of water is physically bound to the raw gypsum. The amount of physically bound water can vary within a broad range and can be removed by drying. A second type of water is chemically bound to the gypsum by a coordination bond to the calcium ion. It forms water of crystallization. A higher amount of energy is necessary to remove such coordinatively bound water molecules. After removal a recoordination of water molecules can occur in the presence of water.

Gypsum as obtained from a mine usually is formed from $CaSO_4 \cdot 2H_2O$, i.e. theoretically comprises two water molecules coordinated to the calcium ion. However, since gypsum mined from a mine, i.e. a natural source, can comprise other minerals in low amounts the amount of water of crystallization comprised in the raw gypsum can deviate from the theoretical value.

In a first step the content of water of crystallization comprised in the raw gypsum is determined by NIR spectroscopy. The content of water of crystallization comprised in the raw gypsum is designated "$C_r$".

Then an amount $\Delta$ is defined, corresponding to an amount of water of crystallization to be removed from the raw gypsum.

For example, when calcium sulfate dihydrate is used as raw gypsum, i.e. as starting material for the calcination process, then two water molecules correspond to the content of water of crystallization $C_r$ as determined in the raw gypsum by NIR spectroscopy.

When β-Hemihydrate ($CaSO_4 \cdot \frac{1}{2}H_2O$) is to be obtained by the calcination process, then theoretically 0.5 water molecules are comprised in the calcined gypsum as determined in the calcined gypsum by NIR spectroscopy.

For the $\Delta$ is then defined 1.5 water molecules that have to be removed by the calcination process.

The explanation is provided here by reference to water molecules. However it is also possible to define the water content and the $\Delta$ in wt.-%.

A set-point S for a content of water of crystallization comprised in the calcined gypsum is determined by subtracting $\Delta$ from $C_r$ ($S=C_r-\Delta$). The Setpoint S corresponds to the theoretical content of water of crystallization comprised in the calcined gypsum. In the example explained above the set point S would be 0.5 water molecules with $C_r$ corresponding to two water molecules and $\Delta$ corresponding to 1.5 water molecules.

The raw gypsum is then fired at a fire rate to obtain calcined gypsum.

In the calcined gypsum a content of water of crystallization $C_c$ is then determined by NIR spectroscopy.

If the content of water of crystallization $C_c$ corresponds to the setpoint S, then the calcination process is continued at the preset conditions.

If the content of water of crystallization $C_c$ deviates from the setpoint S, then the calcination process is adjusted such that $S-C_c=0\pm\delta$, wherein $\delta$ is a maximum deviation. After adjustment of the fire rate, the content of water of crystallization $C_c$ again corresponds to the setpoint S.

Since in a technical process always a deviation from theoretical values occurs and can be tolerated a maximum deviation $\delta$ is defined that can be tolerated without incurring a significant loss of quality in the end product, i.e. the calcined gypsum. The maximum deviation is defined according to the process conditions, the size of the calcination unit and the quality specifications of the calcined gypsum and can be defined by the skilled artisan based on his general knowledge. The maximum deviation can be set according to an embodiment to ±10%, according to a further embodiment to ±5%.

According to an embodiment the fire rate is adjusted by adjusting the feed rate of the raw gypsum to the calcination unit.

According to another embodiment, the fire rate is adjusted by adjusting the calcination temperature.

In case the water content of the calcined gypsum or according to a further embodiment the content of water of crystallization $C_c$ of the calcined gypsum is higher than the desired amount of water contained in the calcined gypsum or is higher than the setpoint S, then the calcination temperature is increased or the feed rate of raw gypsum to the calcination unit is decreased.

In case the water content of the calcined gypsum or according to a further embodiment the content of water of crystallization $C_c$ of the calcined gypsum is lower than the desired amount of water contained in the calcined gypsum or is lower than the setpoint S, then the calcination temperature is decreased or the feed rate of raw gypsum to the calcination unit is increased.

It is also possible to combine both embodiments by concurrently adjusting the calcination temperature and the feed rate of the raw gypsum.

Since an adjustment of the calcination temperature, e.g. by adjustment of the amount of fuel introduced into the calcination unit, is slow, an adjustment of the calcination temperature is preferably performed upon large deviations caused e.g. by a large increase of the moisture content of the raw gypsum or large variation of raw gypsum's purity.

As mentioned above, the process according to the invention can be used to automatize the calcination process. According to an embodiment a process controller, e.g. a suitable computer unit, is provided and the adjustment of the fire rate is performed by the process controller.

According to an embodiment, the calcined gypsum is plaster of Paris. Plaster of Paris comprises hemihydrate in large amounts besides small amounts of anhydrite.

The invention further pertains to an apparatus for modifying gypsum comprising:
  a feeder for feeding a raw gypsum to a calcination unit;
  a calcination unit for calcining the raw gypsum;
  a discharging unit for discharging calcined gypsum from the calcination unit, and
  a first NIR (Near Infrared) spectroscopy measuring station to determine the content of water or content of water of crystallization comprised in the calcined gypsum.

According to an embodiment of the invention, a second NIR spectroscopy measuring station is provided to determine the content of water or the content of water of crystallization in the raw gypsum.

The apparatus is suitable for performing the process described above. Details of the process described above therefore also apply to the apparatus according to the invention and vice versa.

Basically, a known apparatus for calcining raw gypsum can be modified by adding at least one NIR measuring station for determination of the content of water of crystallization in the calcined gypsum. Advantageously, the apparatus comprises at least two NIR measuring stations so that in addition to the content of water of crystallization the water content of the raw gypsum can be determined.

The apparatus according to the invention comprises a feeder for feeding a raw gypsum to a calcination unit. The feeder provides a continuous feed of raw gypsum. Known feeders can be used.

The apparatus can further comprise additional devices for modification of the raw gypsum. Such devices are e.g. a mill for crushing or milling the raw gypsum to a desired particle size or a dryer for removing excess moisture from the raw gypsum and adjusting the content of water comprised in the raw gypsum.

The apparatus according to the invention further comprises a calcination unit for calcining the raw gypsum. Known calcination units can be used. According to a still further embodiment, the apparatus comprises a combined milling/calcining unit. Suitable calcination units have already been described. According to an embodiment, a flash calciner is used as available on the market.

The apparatus according to the invention further comprises a discharging unit for discharging calcined gypsum from the calcination unit. The discharging unit provides a continuous feed of calcined gypsum. Known discharging units can be used.

According to the invention, NIR (Near Infrared) spectroscopy units are provided to determine the content of water or water of crystallization comprised in the gypsum in the processing steps of the process according to the invention described above. The NIR spectroscopy units form the NIR measuring stations described above. As already described above the NIR spectroscopy units can be positioned directly at the continuous feed of gypsum to determine the water content directly in the gypsum feed. According to a preferred embodiment, the NIR spectroscopy units are positioned separated from the continuous gypsum feed and samples are taken from the continuous gypsum feed and transported to the NIR spectroscopy units for analysis.

A first NIR (Near Infrared) spectroscopy unit is provided to determine the content of water or water of crystallization comprised in the calcined gypsum. This first NIR spectroscopy unit is positioned downstream of the calcination unit.

According to an embodiment of the invention further a second NIR spectroscopy unit can be provided to determine the content of water and/or water of crystallization in the raw gypsum. The second NIR spectroscopy unit is provided upstream of the calcination unit.

Suitable NIR spectroscopy units are available on the market and are known for process control, e.g. in the food industry.

According to a further embodiment, a cooling unit is provided for cooling the calcined gypsum. According to an embodiment, the first NIR spectroscopy unit is provided at a position to determine the content of water of crystallization after cooling of the calcined gypsum. The first NIR spectroscopy unit is then positioned downstream of the cooling unit, i.e. downstream of the calcination unit and the cooling unit.

Suitable cooling units are known to the skilled artisan and are available on the market.

According to a further embodiment, a third NIR spectroscopy unit is provided to determine the content of water of crystallization in the calcined gypsum before cooling of the calcined gypsum.

According to this embodiment, the third NIR spectroscopy unit is positioned downstream of the calcination unit but upstream of the cooing unit. The use of three NIR spectroscopy units allows a very precise control of the calcination process.

As already described, the process according to the invention allows automatization of the calcination process. According to an embodiment a process controller is provided for adjusting a fire rate of the calcination unit based on data determined by the first NIR spectroscopy unit and preferably on data of at least one of the second and third NIR spectroscopy units.

BRIEF DESCRIPTION OF THE DRAWINGS

The process according to the invention will be described in more detail with reference to the accompanying drawings. The figures of the drawings show:

FIG. 1 schematically shows the components of an apparatus according to the invention. Raw gypsum is transported on a conveyor 1, e.g. a belt conveyor. The conveyor has a constant transportation rate for providing a continuous feed of raw gypsum. The raw gypsum can be adjusted in a mill (not shown) to desired particle size and can be adjusted to a desired water content in a dryer (not shown). A scale 2 is provided at the conveyor 1 for determination of the feed rate of the gypsum feed transported by conveyor 1. In scale 2 the amount of raw gypsum provided in the raw gypsum feed is continuously or discontinuously weighed. A NIR spectroscopy unit 3 is provided for determination of the content of water or water of crystallization in the raw gypsum. The raw gypsum is then transported to a calcination unit 4, e.g. a flash calciner. The calciner unit 4 is equipped with a heating unit 5 for providing heat for calcination. Into the heating unit 5 are introduced fuel and air to be burned and the hot gases are then introduced into the calcination unit 4. As fuel can be used every suitable fuel, e.g. natural gas, light petroleum gas, heavy oil, coal, etc. After calcination the calcined gypsum is removed from the calcination unit (4). In case of a flash calciner the mixture of hot gases and calcined gypsum is transferred into a separating unit 6 to separate gases which are discharged through a discharging line 7 from the calcined gypsum. The calcined gypsum which is still hot is discharged from separator 6 and is transported by a conveyor 8, e.g. a conveyor screw. The hot calcined gypsum is cooled in a cooling unit 9 to about room temperature. Downstream of the cooling unit is positioned a further NIR spectroscopy unit 10 for determination of the water content or content of water of crystallization in the calcined gypsum.

FIG. 2 shows a scheme showing an embodiment in which a sample is taken form the continuous feed of raw gypsum for NIR analysis.

Figure 1:
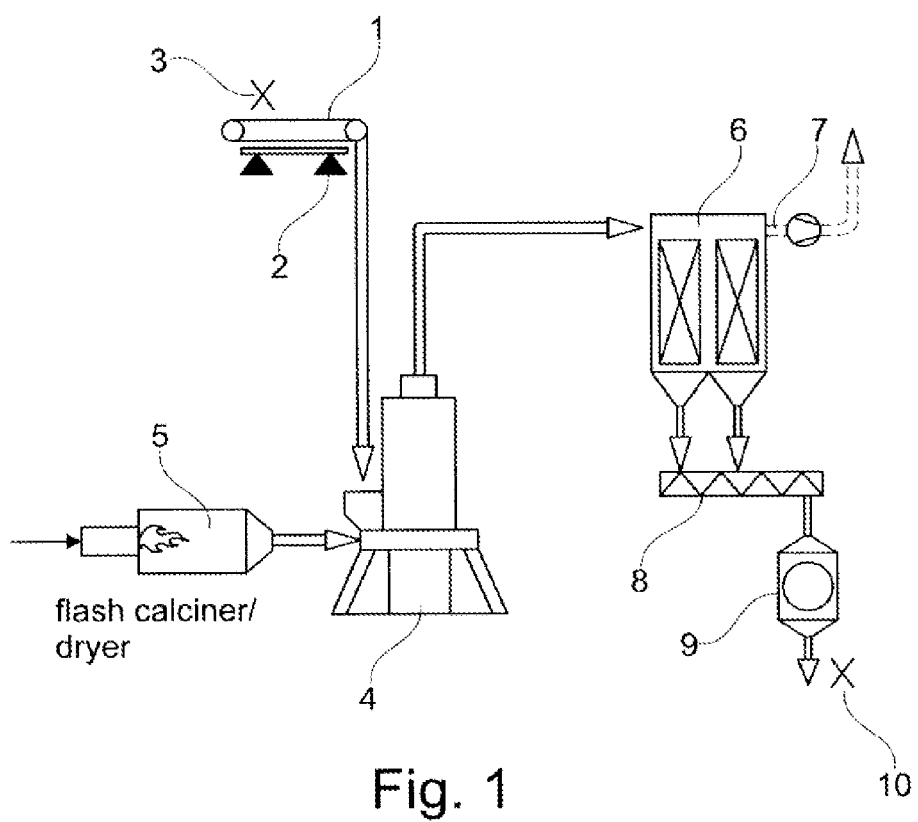
FIG. 1: a scheme of the components of an apparatus according to the invention.
Figure 2:
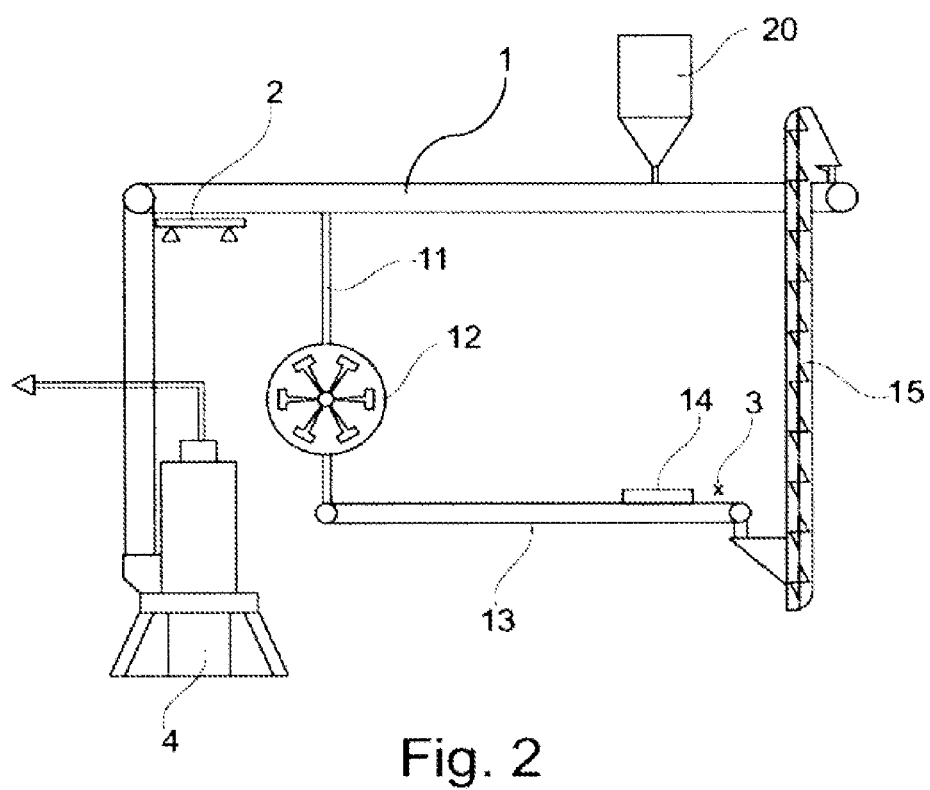
FIG. 2: a scheme showing an embodiment in which a sample is taken from the continuous feed of raw gypsum for NIR analysis.

A raw gypsum feed from a silo 20 is transported on a conveyor 1 to a belt scale 2 to weigh and adjust the raw gypsum feed. The particle size of the raw gypsum is adjusted to less than 60 mm. Part of the raw gypsum feed is separated into a separation line 11 whereas a main feed is transported further by conveyor 1 towards the calcination unit 4. The separated raw gypsum is transported in separation line towards a mill 12 for adjustment of particle size to less than 2 mm. Downstream of mill 12 the milled raw gypsum is transported on a belt conveyor 13 to pass an adjustment device 14 to adjust layer thickness of the raw gypsum layer transported on belt conveyor 13 and to smooth the upper surface of the raw gypsum layer. The raw gypsum layer then passes NIR spectroscopy unit 3 for determination of the water content or content of water of crystallization of the raw gypsum. After having passed NIR spectroscopy unit 3 the raw gypsum is transported by a bucket elevator 15 back to the main feed of the raw gypsum transported on conveyor 1.

REFERENCE LIST 1 conveyor
2 scale
3 NIR spectroscopy unit
4 calcination unit
5 heating unit
6 separator
7 discharging line
8 conveyor
9 cooling unit
10 NIR spectroscopy unit
11 separation line
12 mill 13 belt conveyor
14 adjustment device
15 bucket elevator
20 silo

The invention claimed is:

1. Process for dehydrating gypsum, wherein
a continuous feed of raw gypsum is provided;
the raw gypsum is calcined in a calcination unit at a fire rate to remove water from the raw gypsum and to obtain a continuous feed of calcined gypsum having a water content within a selected range;
a water content of the calcined gypsum is determined by near infrared spectroscopy, and
the fire rate is adjusted based on the water content of the calcined gypsum.

2. Process according to claim 1, wherein a water content of the raw gypsum is determined in the continuous feed by near infrared spectroscopy (NIR) measurement and the fire rate is adjusted based on the water content of the raw gypsum and of the calcined gypsum.

3. Process according to claim 1, wherein after calcination the calcined gypsum is cooled and the water content of the calcined gypsum is determined by NIR spectroscopy in a continuous feed of cooled calcined gypsum.

4. Process according to claim 1, wherein a gypsum sample is taken from at least one of the group of continuous feed of raw gypsum, continuous feed of calcined gypsum, and continuous feed of cooled calcined gypsum for analysis by NIR spectroscopy.

5. Process according to claim 3, wherein at least one external measuring station is provided for NIR measurement and the gypsum sample is transported to the at least one external measuring station for determination of the water content of the gypsum sample.

6. Process according to claim 4, wherein the gypsum sample is provided at the measuring station in a standardized sample form.

7. Process according to claim 1, wherein the adjustment of the fire rate is performed by adjustment of the feed rate of the raw gypsum to the calcination unit.

8. Process according to claim 1, wherein a first gypsum sample is taken from the continuous feed of raw gypsum, the continuous feed of raw gypsum is calcined in the calcination unit and a second sample is taken from the continuous feed of calcined gypsum, wherein the second sample is taken from a spot within the continuous feed of calcined gypsum that corresponds to a spot of the continuous feed of raw gypsum, where the first gypsum sample has been taken.

9. Process according to claim 1, wherein
the water content of the raw gypsum comprises a moisture content of physically bound water and a content of water of crystallization, and a content of water of crystallization $C_r$ is determined in the raw gypsum by NIR spectroscopy;
an amount $\Delta$ is defined, corresponding to an amount of water of crystallization to be removed from the raw gypsum;
a set-point for a content of water of crystallization S comprised in the calcined gypsum is determined by subtracting $\Delta$ from $C_r$ ($S=C_r-\Delta$);
the raw gypsum is fired at a fire rate to obtain calcined gypsum;
a content of water of crystallization $C_c$ of the calcined gypsum is determined by NIR spectroscopy; and
the fire rate is adjusted such that $S-C_c=0\pm\delta$, wherein $\delta$ is a maximum deviation.

10. Process according to claim 1, wherein a process controller is provided and the adjustment of the fire rate is performed by the process controller.

11. Apparatus for dehydrating gypsum comprising:
a feeder for feeding a raw gypsum to a calcination unit;
a calcination unit for calcining the raw gypsum;
a discharging unit for discharging calcined gypsum from the calcination unit, and
a first NIR (Near Infrared) spectroscopy unit to determine the content of water or water of crystallization comprised in the calcined gypsum.

12. Apparatus according to claim 11, wherein a second NIR spectroscopy unit is provided to determine the content of water or water of crystallization in the raw gypsum.

13. Apparatus according to claim 11, characterized in that a cooling unit is provided for cooling the calcined gypsum and the first NIR spectroscopy unit is provided at a position to determine the content of water of crystallization after cooling of the calcined gypsum.

14. Apparatus according to claim 11, characterized in that a third NIR spectroscopy unit is provided to determine the content of water of crystallization in the calcined gypsum before cooling of the calcined gypsum.

15. Apparatus according to claim 11, characterized in that a process controller is provided for adjusting a fire rate of the calcination unit based on data determined by the first NIR spectroscopy unit and on data of at least one of the second and third NIR spectroscopy units.

* * * * *